United States Patent
Loyzim

[15] 3,684,934
[45] Aug. 15, 1972

[54] STEPPING MOTOR DRIVE CIRCUIT WITH PATH FOR INDUCED VOLTAGES

[72] Inventor: Robert J. Loyzim, Coventry, Conn.
[73] Assignee: The Superior Electric Company, Bristol, Conn.
[22] Filed: Jan. 11, 1971
[21] Appl. No.: 105,329

[52] U.S. Cl....................................318/696, 318/138
[51] Int. Cl..............................................H02k 37/00
[58] Field of Search.......318/696, 685, 138, 254, 439

[56] References Cited

UNITED STATES PATENTS

| | | |
|---|---|---|
| 3,444,447 | 5/1969 | Newell.......................318/696 |
| 3,530,347 | 9/1970 | Newell.......................318/138 |
| 3,401,323 | 9/1968 | French.......................318/696 |
| 3,486,096 | 12/1969 | Van Cleave...............318/696 |
| 3,402,334 | 9/1968 | Newton.....................318/696 |

*Primary Examiner*—G. R. Simmons
*Attorney*—Johnson & Kline

[57] ABSTRACT

The tendency of a stepping motor having bifilar windings to oscillate or resonate at light loads and relatively high speeds is minimized by a path which initially absorbs most of the energy in the induced voltages and then returns the energy slowly to the power supply. The path also decreases the time which the induced voltage back-biases the power supply and prevents it from energizing the windings for the next step.

7 Claims, 2 Drawing Figures

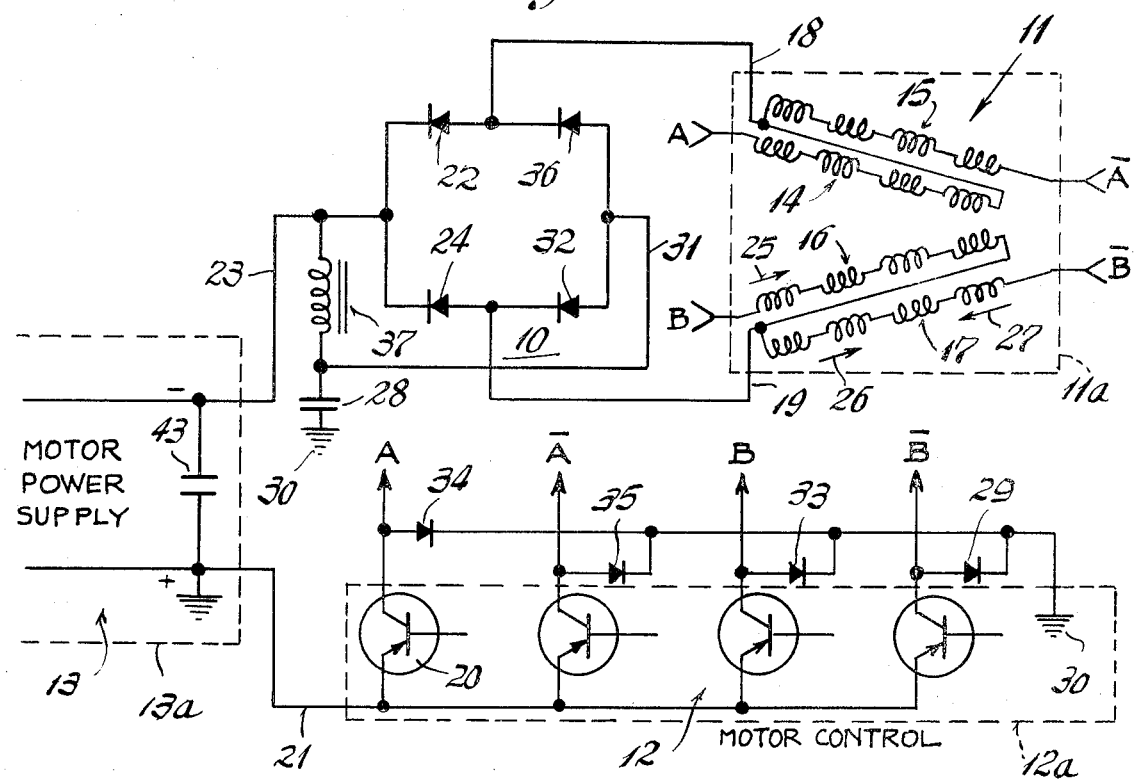
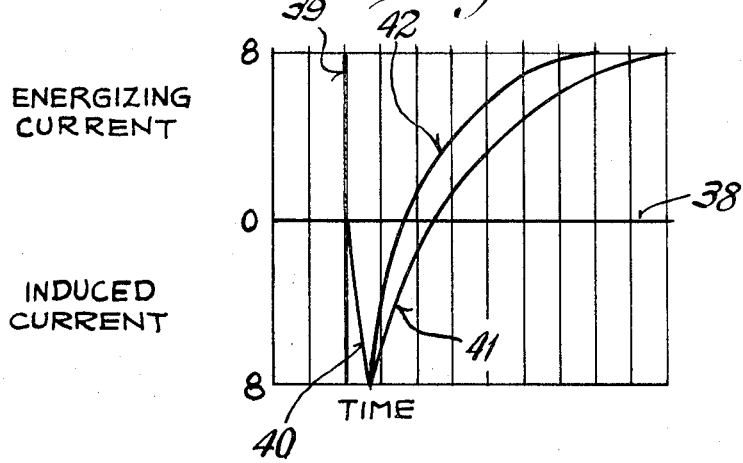

STEPPING MOTOR DRIVE CIRCUIT WITH PATH FOR INDUCED VOLTAGES

In my copending application Ser. No. 56,526, filed July 20, 1970 and entitled Power Supply For a Stepping Motor there is disclosed a stepping motor which has a plurality of poles, with each pole having a winding. By changing the energization of the windings, and hence the magnetic polarity of the poles, the motor may be made to move one step for each change. While the winding may be unitary, the winding specifically shown for each pole is bifilar, having two separate coils, with energization of one coil causing its pole to be of one magnetic polarity, while energizing the other coil causes the pole to be of the opposite magnetic polarity. A change of energization consists of deenergizing one coil on some of the poles while energizing the other coil on the same poles. At the time of the change the coils to be energized have initially induced therein a voltage caused by the deenergization of the previously energized coils. A pulse-to-step motor control circuit such as disclosed in U.S. Pat. No. 3,117,268 assigned to the assignee of the present invention may provide relatively fast changes of energization in response to pulses.

In some instances, especially at no or light loads in a relatively high speed range on the order of perhaps 750 to 1,500 steps per second, the induced voltages appear to create a tendency for the motor to oscillate or resonate. Such resonance, if occurring, not only substantially reduces the torque of the motor, but may in fact cause the motor not to move a step for a change in energization. Both of these occurrences have been found, in many instances, to prevent satisfactory usage of the motor.

It is accordingly an object of the present invention to reduce the tendency of a stepping motor having bifilar windings from oscillating and/or resonating when operating at no or light loads in a relatively high speed range.

A further object of the present invention is to achieve the above object by forming a path for the induced voltages which absorbs the energy created by the induced voltages to thereby minimize their effect on the motor and yet enables a substantial portion of the absorbed energy to be returned to the main power supply for driving the motor.

Another object of the present invention is to provide a path for induced voltages created in a bifilar wound stepping motor, which decreases the time that the induced voltages prevent the coils from being energized to their desired state by the power supply and which is continually in the circuit for use but yet does not interfere with the operation of the motor when not required.

Still another object of the present invention is to achieve the above objects with a motor energizing circuit that has an induced voltage path which is extremely simple in construction, may be easily incorporated into presently existing stepping motor circuits, is reliable in use and which is relatively economical to manufacture.

In carrying out the present invention, the motor and control circuit therefor for producing the changes of energization are essentially as shown in my above-noted application which also shows the power supply for providing to the motor unidirectional power derived from a source of A.C. The windings of alternate stator poles are connected into two phases A and $\overline{A}$, with each phase having a coil of a pole, while the windings of the remaining half of the poles are also connected into two phases B and $\overline{B}$, again with each phase having a coil of a pole. Each phase is separately capable of being energized by the motor control circuit that is connected to the power source. The phases are connected into two pairs A and $\overline{A}$ and B and $\overline{B}$ with a lead being connected to the common junction of each pair of the phases.

Induced voltages formed in the coils of the phases to be energized are directed to a capacitor by diodes that form a path that includes the leads to the phases, while additional diodes prevent the power from the motor control circuit from being directed to the capacitor. When there is a change of energization in one of the phases in a pair, for example, for phase $\overline{B}$ being deenergized and phase B being energized, the voltage induced in the coils of phase $\overline{B}$ by deenergization of the coils in phase B is directed by the path to the capacitor which stores a substantial portion of the energy created by the induced voltages. This stored energy is accordingly effectively removed from the motor to decrease its effect thereon. Additionally, the induced voltage is in opposition to the voltage from the power supply that energizes phase B but the path, by directing the induced voltage to the capacitor, decreases its ability to block energization of the phase to be energized.

Thus, by reducing the undesired movement which the induced voltage could cause by magnetizing their poles in the motor and also by reducing their opposition to the proper energization of the phases, the motor may be made to operate, without oscillation, at light loads at a relatively high speed range.

While the stored energy may be dissipated or otherwise wasted, the present invention directs the stored energy to the power supply so that perhaps 80 percent of the energy in the induced voltages is reused yet the circuit, even while conserving the energy, also prevents the induced voltages from placing their high value on the components of the motor control circuit.

Other features and advantages will hereinafter appear.

Referring to the drawing:

FIG. 1 is a diagrammatic and schematic circuit of a stepping motor and drive circuit therefor in which the present invention is incorporated.

FIG. 2 is a graphic representation of currents which initially occur in the coils of a phase that is being energized.

Referring to the drawing, the path for induced voltages of the present invention is generally indicated by the reference numeral 10 and is shown interconnected between a stepping motor 11 enclosed within a block 11a, a motor control circuit 12 enclosed within the block 12a and a power supply 13 enclosed within the block 13a. The motor 11 shown has eight stator poles with each pole having a winding consisting of two separate coils that are wound oppositely on the pole. A phase such as the phase A includes the coils of four alternate poles connected in series and indicated by the reference numeral 14 while the other coils on the same poles are serially connected to form a phase $\overline{A}$, indicated by the reference numeral 15. As to the intermediate poles one coil of each is serially connected to form the phase B, indicated by the reference numeral 16 while the reference numeral 17 indicates the other coils of the same poles being serially connected to form the phase $\overline{B}$. It will be understood that the motor may have a different number of poles and the coils in a phase may be interconnected differently if desired and the invention is not to be limited to the specific motor described.

One end of the phases A and $\overline{A}$ (14 and 15) are connected together to have a common junction to which a lead 18 is connected. Similarly a lead 19 is connected to the common junction of the phases B and $\overline{B}$ (16 and 17).

The motor control 12 has four output leads denoted A, $\overline{A}$, B and $\overline{B}$ which are connected to the inputs of the motor phases having the same reference indication. Each of the motor control outputs leads is connected to a transistor and for the lead A, for example, specifically to a transistor 20 which when caused to be conducting, enables current to flow from a positive ground lead 21 of the power supply 13 through the transistor 20, and the lead A to coils 14 and then through the common lead 18 and a diode 22 to a negative lead 23 of the power supply. Each of the other motor control output leads similarly has a transistor associated therewith and upon conduction of the transistor, the phase associated with each output lead will be energized.

It will be noted that the return path to the negative lead 23 for the coils 16 and 17 is through the common lead 19 and a diode 24 while the coils 15 also use diode 22 and lead 18.

As is well known in the art the phases may be energized according to a four step sequence, namely, AB, $\overline{AB}$, $\overline{AB}$, $\overline{AB}$, AB, etc., so that there is one coil on each pole that is energized at all times. Moreover, the coils on each pole are wound oppositely such that one when energized produces a N magnetic polarity of its pole while the other when energized produces a S polarity of the pole.

With the phases AB energized and it is desired to move the motor one step, then the phase B must be deenergized and the phase $\overline{B}$ energized. With phase B energized, current flows in the direction indicated by the arrow 25 in the serially connected coils 16. Upon cessation of conduction caused by rendering the transistor associated with the lead B nonconducting, the change of current flow (i.e. stoppage) in the phase B causes a voltage to be induced in the coils 17 which has a direction indicated by the arrow 26. This is in opposition to the voltage from the lead $\overline{B}$ which when energizing the coils of phase $\overline{B}$ has a direction which is indicated by the arrow 27.

The effect of the induced voltage in the coils 17 appears to be two-fold, namely, it appears to maintain the polarity of the poles the same as if phase B were still energized and also it opposes the rapid energization of the coils of phase B by the motor control circuit both of which effects appear to have a tendency to cause the motor to oscillate or resonate at no or light loads when operating in a relatively high speed range, one range being perhaps 750 to 1,500 steps per second.

In heretofore motor control circuits, the induces voltages were more or less permitted to be absorbed by the power supply or otherwise dissipated until their value became insignificant. However, in accordance with the present invention, there is provided a path for immediately removing the induced voltages from the coils and transferring their energy into a capacitor 28. For the coils of phase $\overline{B}$, the path includes the connection $\overline{B}$ of the motor control and a diode 29 connected to the positive ground 30. The capacitor 28 has one side connected to the positive ground 30 and its other side is connected by a lead 31 to a diode 32 which connects with the common lead 19. Current created by the induced voltages in the coils 17 will thus flow in the lead $\overline{B}$, diode 29, ground 30, capacitor 28, lead 31, diode 32 and common lead 19.

It will be understood that the diode 29 provides a low resistance path for the induced voltages and hence prevents high induced voltages from being impressed upon the motor control circuit components. Also, the path for the induced voltages is directed by the lead 19 to the coil 17 where the voltages are generated and hence the current caused by the induced voltages will not flow to the negative lead 23 of the power supply through the diode 24.

Each of the other phase coils 14, 15 and 16 have a similar path with the induced voltages in the coils 16 of phase B being directed through a diode 33 associated with the lead B and the common lead 19, while the voltages induced in the coils 14 and 15 have a path which includes diodes 34 and 35 associated with the leads A and $\overline{A}$ and a diode 36 that is connected to the common lead 18. It will thus be understood that each of the coils 14 through 17 is provided with a path that includes the capacitor 28 with the path being completed about the ends of each coil. Moreover, each of the paths, except for the capacitor 28, has very little impedance, basically only that provided by the diodes in the path. Accordingly, the current produced by each induced voltage is thus directed to increase the charge on the capacitor 28 and which in so doing absorbs the energy produced by the induced voltage and removes it from the motor.

The energy stored in the capacitor 28 is returned to the power supply by means of an inductor 37 connected between the capacitor 28 and the negative lead 23. The inductor accordingly prevents a rapid discharge of the energy in the capacitor 28 into the power supply or motor while permitting the energy to be returned to the supply for use in subsequent energizing of the motor with perhaps 80 percent of the induced voltage energy being capable of being reused.

Referring to FIG. 2, there is shown a representation of the currents which occur in the set of coils that is to be energized. The abscissa of the sketch represents time, while the ordinant represents values of current and has a zero reference indicated by the reference numeral 38. The current values increasing downwardly are designated "induced current," while the values increasing upwardly are designated "energizing current" and are obtained from the power supply 12. A change of the motor control from having lead B conducting to having lead $\overline{B}$ conducting by shifting the conductance of their respective transistors may occur upon a vertical time reference line 39 and be basically instantaneous for both. The induced current in coils 17 is represented by a downwardly curved line 40 and, as it is absorbed, the energizing current from the lead $\overline{B}$ has values as shown in an upwardly extending line 41. The line 41 is thus representative of the coil energizing current without the induced voltage path of the present invention, while a line 42 represents the energizing current which occurs using the present invention.

It will be seen that the current in the line 42 increases substantially faster to the desired level 8 than that in the line 41, and hence the proper current will flow through the coils of phase B to magnetize their poles faster than if the circuit of the present invention were not utilized. This results in the magnetic polarity of the poles being more rapidly changed to that commanded by the motor control circuit. In this way the time in which the polarity of the poles is not under the control of the motor control circuit is reduced by perhaps 10 to 30 percent, thereby providing more control of the stator poles over movement of the rotor by decreasing the time in which the stator poles do not have the magnetic polarity dictated by the motor control circuit and hence do not control the rotor movement.

As an example, if the motor is stepping at 1,000 steps per second in a four step sequence, the energization in phases B and $\overline{B}$ is changed every 2 milli-seconds, the time for the induced current 40 to decay to zero may be one-fifth a milli-second, and the time for the current 41 to reach its desired level of 8 may be 1 milli-second. With the present circuit in one unit it has been found that the time for the current 42 to reach the desired level of 8 requires slightly more than three-fourths a milli-second, thereby decreasing the length of time between steps when neither phase is completely energized by the power source.

It has been found that the size or capacity of the capacitor 28 should be less than the size of a capacitor 43 in the power supply 13, with the former being typically several hundred microfarads while the latter may be typically 10,000 microfarads. As the size of the capacitor 28 approaches the size of the capacitor 43, the effect of the discharge path in the circuit decreases in effectiveness and, when they are about equal, the effect of the discharge path is not noticeable. On the other hand, the motor prefers to discharge its induced voltage into a small capacitor so that it may charge the capacitor quickly by permitting the motor to develop the higher induced voltage, which causes the energy of the induced voltage to be transferred more quickly to the capacitor. However, it has been found that the size of the capacitor 28 should be such that the maximum voltage thereacross should not greatly exceed the normal voltage from the power supply 13. For example, if the power supply is supplying a voltage of 40 volts to the motor and motor control, then the highest optimum voltage across the capacitor 28 should be around 50 volts. This latter voltage, plus the voltage from the power supply to the conducting coils, causes the maximum that appears across the transistors of the motor control circuit 12 to be about 100 volts, about twice the supply voltage.

In the operation of a circuit it will be understood that each phase is continually connected to the discharge path for operation. Under a non-moving condition, the voltage across the capacitor 28 is approximately that of the power supply voltage, and hence current to the motor control leads A and $\overline{B}$ does not traverse the discharge path. When a step is desired and a phase is deenergized, the induced voltage current in this phase flows through one of the diodes 29 and 33–35 to the capacitor 28 which absorbs the energy produced by the induced voltage and increases its charge, with it being understood that these diodes prevent the higher values of induced voltage from being impressed upon the transistors, such as a transistor 20 in a motor control circuit 12. After the associated phase is energized, the condenser 28 discharges to its normal value through the inductor 37 so that it is essentially at the power supply voltage value when the next change of energization occurs. The rate at which it discharges is relatively slow, in that it is not instantaneous, but yet should essentially occur within the rate at which the motor steps are taken. For example, if the motor is stepping at 1,000 steps per second, then the discharge must occur within 1 milli-second.

For operating conditions when there is a heavy load on the motor, more of the energy in the coil is used to operate the motor and hence there is less available to produce the induced voltages. Thus, though the circuit is always ready to function, it is normally not essential for heavy load conditions.

It will accordingly be understood that there has been disclosed a circuit for operating a stepping motor with each step of the motor requiring a change in energization of some of the coils on the stator poles. For conditions where a relatively high value of induced energy is produced by a change of energization, the present invention provides for a discharge path for the induced current to have the energy absorbed in a capacitor and thereby be effectively removed from the motor. Moreover, the absorbing of the induced voltage energy decreases the time in which the induced voltage opposes the next energizing current to the motor, thereby enabling the next energization to more rapidly magnetize the poles with the desired polarity. The magnetic control of the poles over the rotor is thereby achieved more rapidly. By the use of a discharge path, tendencies of the motor to resonate at no and light loads at relatively high speeds is accordingly substantially minimized.

Variations and modifications may be made within the scope of the claims and portions of the improvements may be used without others.

I claim:

1. In combination with a stepping motor and a motor control circuit therefor in which the stepping motor includes a plurality of poles with each pole having a winding formed into two coils, similar coils of some poles being connected to form at least a first pair of phases with the phases having a common junction, a source of unidirectional power, said motor control circuit being connected to the source and the phases to energize only one phase in the pair simultaneously and to shift the energization in the pair from one phase to the other with the deenergization of one phase causing an induced voltage in the coils of the phase being energized and with the induced voltage being in opposition to the energization, the improvement comprising a lead connected to the common junction of the first pair, a capacitor and path means including diodes, the capacitor and the lead for directing induced voltage currents in the coil to be energized to the capacitor to cause the capacitor to be charged thereby.

2. The invention as defined in claim 1 in which some of the coils of the remaining poles are connected to form a second pair of phases with said second pair having a common junction, a second lead connected to the second common junction, the path means includes further diodes and the second lead for directing induced voltage currents in the second pair of phases to the capacitor, there are connections from the motor control circuit to the phases and in which the path means includes means for shunting the induced voltages away from the motor control circuit.

3. The invention as defined in claim 2 in which the capacitor has a value of voltage thereacross and in which the shunt means shunts induced voltages of higher value than said capacitor voltage from the motor control means.

4. The invention as defined in claim 3 in which each phase has a lead from the motor control circuit, in which the motor control circuit includes a semiconductor means connected to each lead for controlling conduction between the power supply and a lead and in which the shunt means includes a diode connected between each lead and its semiconductor means.

5. The invention as defined in claim 1 in which the power supply supplies a nominal voltage and in which the capacitor has a size which causes the induced voltage to charge the capacitor to a voltage value only somewhat above the nominal value of the power supply voltage.

6. The invention as defined in claim 1 in which there are means connected between the capacitor and the power supply means for discharging the capacitor slowly between each occurrence of an induced voltage.

7. The invention as defined in claim 6 in which the discharge means includes an inductor and in which the discharge means normally maintains the charge across the capacitor at least at the voltage level of the power supply.

* * * * *